(12) United States Patent
Simon

(10) Patent No.: US 6,974,078 B1
(45) Date of Patent: Dec. 13, 2005

(54) PERSONAL COMMUNICATION DEVICE WITH BAR CODE READER FOR OBTAINING PRODUCT INFORMATION FROM MULTIPLE DATABASES

(75) Inventor: David Simon, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/407,666

(22) Filed: Sep. 28, 1999

(51) Int. Cl.[7] .......................... G06K 15/00; G06F 17/00
(52) U.S. Cl. ................... 235/383; 235/375; 235/462.01
(58) Field of Search .............. 235/375, 462.01–462.48, 235/472.01, 472.02, 472.03, 454, 455, 470, 235/380, 382, 383; 705/26, 27

(56) References Cited

U.S. PATENT DOCUMENTS

| | | | |
|---|---|---|---|
| 5,331,136 A | | 7/1994 | Koenck et al. ............. 235/375 |
| 5,434,394 A | | 7/1995 | Roach et al. ............... 235/375 |
| 5,550,358 A | | 8/1996 | Tait et al. .................. 235/380 |
| 5,664,110 A | | 9/1997 | Green et al. ................. 705/26 |
| 5,679,943 A | | 10/1997 | Schultz et al. ............. 235/472 |
| 5,804,803 A | * | 9/1998 | Cragun et al. .............. 235/375 |
| 5,821,523 A | | 10/1998 | Bunte et al. ................ 235/472 |
| 5,869,819 A | * | 2/1999 | Knowles et al. ............ 235/375 |
| 5,877,975 A | | 3/1999 | Jigour et al. ................. 365/52 |
| 5,903,729 A | * | 5/1999 | Reber et al. ................ 709/219 |
| 5,905,248 A | | 5/1999 | Russell et al. .............. 235/462 |
| 5,933,829 A | | 8/1999 | Durst et al. |
| 5,938,727 A | * | 8/1999 | Ikeda .......................... 709/218 |
| 5,978,773 A | | 11/1999 | Hudetz et al. |
| 5,995,105 A | * | 11/1999 | Reber et al. ................ 345/356 |
| 6,049,835 A | * | 4/2000 | Gagnon ....................... 709/245 |
| 6,061,738 A | * | 5/2000 | Osaku et al. ............... 709/245 |
| 6,064,979 A | * | 5/2000 | Perkowski .................... 705/26 |
| 6,108,656 A | | 8/2000 | Durst et al. |
| 6,199,048 B1 | | 3/2001 | Hudetz et al. |
| 6,211,858 B1 | * | 4/2001 | Moon et al. ................ 345/146 |
| 6,282,433 B1 | * | 8/2001 | Holshouser ................. 455/556 |
| 6,307,562 B1 | * | 10/2001 | Taivalsaari ................. 345/473 |

OTHER PUBLICATIONS

Preston Gralla, "How the Internet Works, Millennium Edition" 1999, Que Publishing, pp. 4-55, 154-169, 210-213, 249-269, and 298-303.*

(Continued)

Primary Examiner—Thien M. Le
(74) Attorney, Agent, or Firm—Townsend and Townsend and Crew LLP; Gerald T. Gray

(57) ABSTRACT

A communication system including a personal communication device that allows a user to communicate over the Internet with a network of multiple remote databases and to search the databases for desired product-related information from any location. The communication device includes an input mechanism, such as a bar code scanner or OCR reader, for entering product information such as product codes from product labels. The communication device establishes a communication link with a communications server, and the product information is transmitted to the server, which interfaces with one or more product information libraries to determine a product identifier based on the input product information. The product identifier is used by the server to search various databases over the Internet for desired product-related information in response to a search query from the user.

25 Claims, 1 Drawing Sheet

OTHER PUBLICATIONS

Rugged Pocketable Computers with Wireless Capability; SPT 1700 Product Information at URL http://www.symbol.com/products/mobile_palm_pi_hdwr_spt1700.html.

Network Management in a Wireless Environment; at URL http://www.symbol.com/products/whitepapers_network_mgmt_in_wi.html.

Pocket-sized Computing for Mobile Industry Professionals; at URL http://www.symbol.com/products/whitepapers/whitepapers_palm_pilot.html.

Communication Subsystem for Spectrum 24®Wireless Networks at URL http://www.symbol.com/products/whitepapers/whitepapers_subsys_spec24.html.

Pocket Shopper; mySimon pocket shopper ; at URL http://www.mysimon.com/consumer_resources/Pocket_Shopper/.

mySimon Press Releases; at URL http://www.mysimon.com/about_mysimon/press/press_releases.anml.

* cited by examiner

PERSONAL COMMUNICATION DEVICE WITH BAR CODE READER FOR OBTAINING PRODUCT INFORMATION FROM MULTIPLE DATABASES

BACKGROUND OF THE INVENTION

The present invention relates to methods and systems using personal communications devices to obtain information from databases over the Internet, and in particular to personal communication devices, such as cellular phones, capable of obtaining product-related information over the Internet from one or more remote databases.

Automated order and delivery systems have been proposed for enhancing customer sales transactions in an environment in which the point-of-sale and merchandise warehouse are located in a combined facility. Such systems provide customers with hand-held sale transaction computers in communication with a central point-of-sale computer system through radio frequency transmissions. When shopping for an item, the customer enters a customer identification number. The customer is then able to build a sale transaction record by reading a product code with a pen or a wand to select the item for purchase. The user is also able to obtain product information from the central computer such as item price, stock availability and a product description. In this manner, the customer is able to build up a sale transaction record and transmit the transaction record to the central computer to effectuate warehouse deliver according to customer entered delivery instructions.

Such systems, however, are limited to providing customers with information from a single proprietary merchandise database operated by a single merchant. The customer is unable to obtain information from other databases that are not operated by the merchant. Further, as the hand-held interface devices must be returned to the merchant, the customer is limited to obtaining any product-related information from the point-of-sale location. Accordingly, what is needed in the art is a portable device that allows a customer to obtain product-related information from multiple databases from any location.

SUMMARY OF THE INVENTION

The present invention provides a communication system including a personal communication device capable of interfacing with multiple databases to obtain product-related information therefrom. More specifically, the personal communication device of the present invention allows a user to communicate over the Internet with a network of multiple remote databases and to search the databases for desired product-related information from any location. The communication device includes an input mechanism, such as a bar code scanner or an optical character recognition (OCR) reader, for entering product information such as product codes or names from product labels. The communication device establishes a communication link with a communications server, and the product information is transmitted to the server, which interfaces with one or more product information libraries to determine a product identifier based on the input product information. The product identifier is used by the server to search various databases over the Internet for desired product-related information in response to a search query from the user. For example, the user may desire to search for product reviews such as consumer reports reviews, or the user may desire to obtain competetive pricing information from multiple merchant databases/websites for the particular product or for closely related products. Other product related information includes the locations of merchants selling the product or related products, related advertising, recall information, popularity of the product and/or company, nutritional information and recipes for food products and personal -related information, such as how many times the user purchased the product in the past.

According to an aspect of the invention, a method is provided for obtaining information related to a specific product from multiple remote databases accessible over the Internet via a communications server using a personal communication device (PCD) having a display and means for communicating with the communication server. The method typically comprises the steps of entering product information into said PCD, transmitting the product information to the communication server from the PCD, transmitting a search query to the communication server from the PCD, wherein the search query includes a request to obtain information related to the specific product, and processing the search query to obtain the product related information from one or more of the multiple remote databases. The method also typically includes the steps of responding to the search query by sending the product related information from the communication server to the PCD, and displaying at least a portion of the product related information on the PCD. According to another aspect, the PCD is a cellular telephone that includes one of a bar code scanner and an OCR reader for entering product information.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
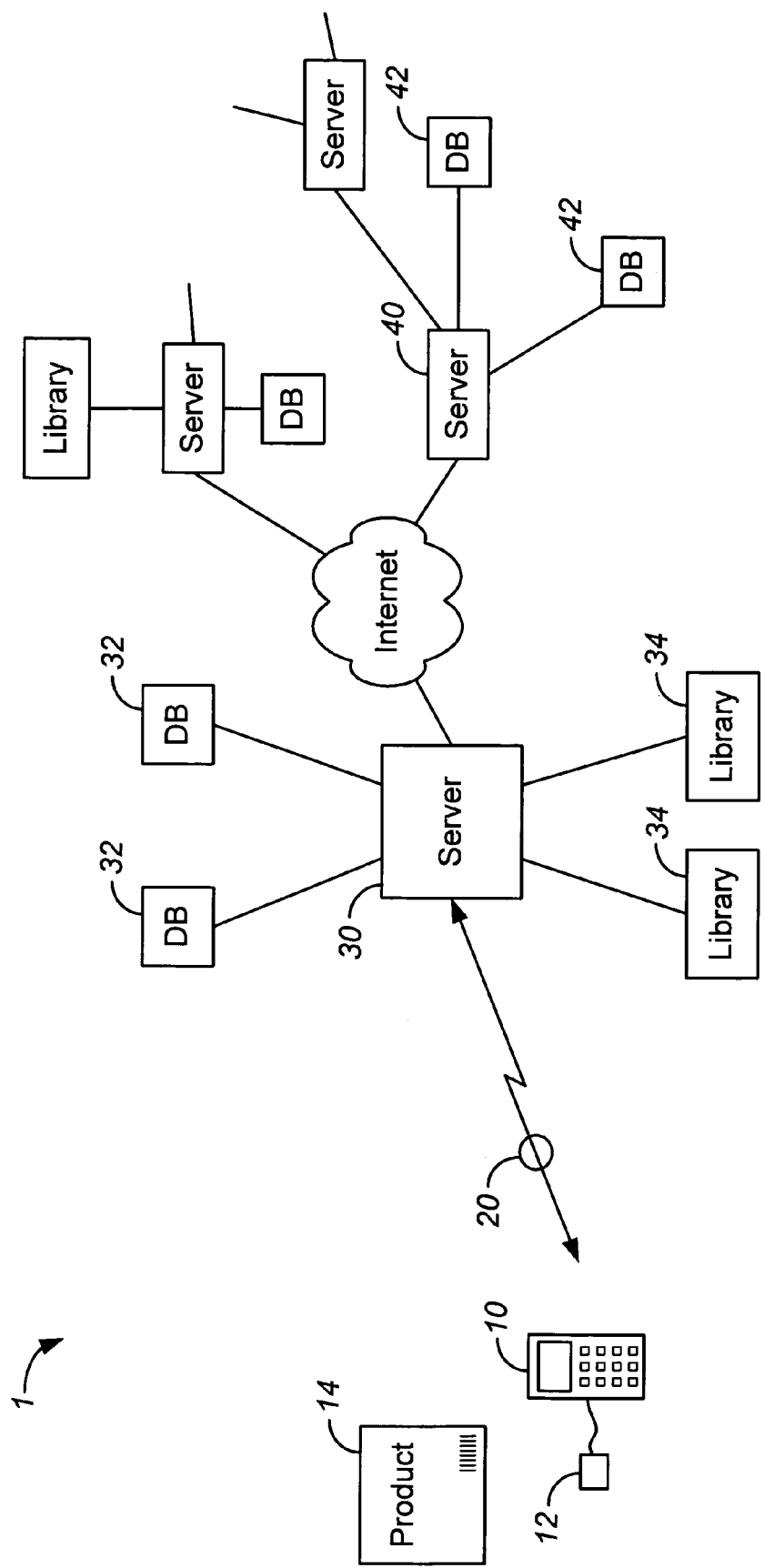
FIG. 1 illustrates a general overview of an information retrieval and communication system according to an embodiment of the present invention.

FIG. 1 illustrates a general overview of an information retrieval and communication system 1 according to an embodiment of the present invention. Communication system 1 includes a personal communication device 10 in communication with a communications server 30 over communication link 20. In a preferred embodiment, personal communication device 10 is a cellular telephone, however, any hand-held personal communication device may be used, including a pager, a palm pilot and the like. Personal communication device 10 includes an input mechanism 12 and a display for providing a graphical user interface and for displaying product-related information to the user. In a preferred embodiment, input mechanism 12 is integrated into the body of personal communication device 10 and includes a bar code scanner for scanning a bar code on a product or product label 14. In an alternate embodiment, input mechanism 12 may include an OCR reader integrated into the body of device 10 or as a separate element attached to device 10 for reading information such as product codes, names, brands, or other information related to a product. In additional embodiments, input mechanism 12 is a separate input element coupled to personal communication device 10, such as a scanning wand or a light pen. Communication device 10 also includes a keypad for manual entry of product information and other information necessary to interface with server 30. In the preferred embodiment, communication link 20 includes a cellular transceiver and any additional equipment as necessary for providing communication signals between communication device 10 and server 30 as is well known.

Server 30 is communicably coupled to one or more databases 32 over one or more network connections. For example, databases 32 may be coupled to server 30 over a storage area network connection, such as a Fibre Channel interconnect, or as part of a local area network or a wide area network. Server 30 is also coupled through the Internet to additional servers and databases such as server 40 and databases 42. Additionally, server 30 is communicably coupled to one or more product information libraries 34, such as product code libraries. Product information libraries 34 can be resident in memory on server 30, coupled via a direct interconnect to server 30, or coupled over any network interconnect such as a LAN, WAN, the Internet or the like. In one embodiment, product information libraries 34 include one or more relational databases.

When a user desires to search for information related to a specific product, the user enters product information into the system. In one embodiment, the user scans a bar code on the label, such as the product's UPC code, using input mechanism 12. Alternatively, the user manually enters the product code via the keypad. In another embodiment, the user reads information into the system using an OCR reader. In one embodiment, the information, such as a product name, model number, sku number, etc. For example, if a product code is entered, the code is transmitted to server 30, which communicates with one or more product code libraries to obtain a product identifier. When a product identifier has been obtained, the user is prompted to enter a search query related to the product identifier. Server 30 processes the search query and returns the results to the user. In an alternate embodiment, the product information is transmitted along with a search query to server 30, which then obtains a product identifier, processes the query and returns the results. The results are displayed on the user interface along with options for selecting additional searches or for performing other functions such as purchasing the product.

As an example, a user browsing in a game store may desire to obtain competetive pricing information related to a specific computer game. The user enters product information, such as a product code from the game box, and inputs a query (or selects an icon on the user interface, e.g.) asking for the best prices for the specific game. Server 30 obtains a product identifier from one of code libraries 34 and processes the search request using the product identifier. For example, server 30 communicates the query to a search engine, which may be resident on server 30 or on a remote server such as server 40. One example of a useful search engine is Yahoo!'s search engine at www.Yahoo.com. Another useful site for obtaining product-related information is the Yahoo! Shopping site at Shopping.Yahoo.com. Alternatively, any search engine, such as a search engine that has data populated by a spider or web crawler, may be used. The search engine processes the query (using the product identifier) and returns results to server 30, which in turn formats and returns the results to communication device 10 in the appropriate format for viewing by the user. The user may then input an additional query related to the same product information, or the user may input information for a different product and conduct a separate information search. For example, the user may input a query asking for consumer reports reviews or other reviews of the product and related products, the user may query the system to purchase the product and arrange delivery from the store the user is currently shopping in without going through in-store check-out, or the user may query the system to purchase the product from one of the competetive stores displayed in the search results.

The present invention also provides numerous other functions in addition to providing a user with the ability to search for basic product-related information. For example, the present invention provides for in-home shopping by allowing a user to obtain information or purchase a product without ever entering a store. A user enters product information for a product that they already own, or that a friend owns, or that is displayed in a magazine, flier or catalog with a product code (e.g., UPC code or other identifier), and the user then conducts a search related to the product to obtain information and/or purchase the product or a similar product. As another example, the user is able to redeem coupons or gift certificates when purchasing a product by additionally entering a code from a coupon or certificate (e.g., scanning or manually entering) which is transmitted to the selling entity or entities. The user may also perform warranty registration by entering the information required on the warranty card provided with a product, such as name, contact information, etc. and entering the product code. The system in response to receiving this information forwards the information to the warranting entity as determined by the product information, by the code from the warranty registration card or through a user conducted search. As yet another example, the present invention allows a user to obtain directions and maps to stores based on search results. The present invention also allows a user to obtain information about current recalls of the desired product or other products, to obtain nutritional information and recipes for food items.

Using the present invention, the user can compile a "wish list" at home or as a user shops, such that when desired the list can be downloaded for personal shopping or the list can be downloaded to one or more stores so that the store(s) can provide offers to sell products on the list at desired prices. The user can also obtain information related to the popularity of the product, such as information about the number of clicks on a product web page, the size of the company selling the product, and whether the product is on a "top ten" list. The user can also obtain personal-related information using the present invention, such as the number of times the product was purchased by the user or the user's household or company in the past. Such personal information is stored in a database in relation to a user identifier and/or password.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of obtaining information related to a specific product from multiple databases accessible over the Internet via a communications server using a hand-held personal communication device (PCD), said PCD having a display and means for communicating with the communication server, the method comprising the steps of:

a) entering product information including at least a product code for the specific product into said PCD;
b) transmitting the product code to the communication server from the PCD;
c) retrieving a product identifier for the specific product from a product information library storing product identifiers in relation to product codes;
d) transmitting a search query to the communication server from the PCD, wherein the search query includes a request to obtain information related to the specific product;
e) processing the search query to obtain the product related information from two or more of the multiple databases by automatically sending the product identifier to a search engine, wherein at least one of the databases is remote from the communication server;
f) retrieving the product related information by the search engine from the two or more databases using the product identifier;
g) responding to the search query by sending the retrieved product related information from the communication server to the PCD; and
h) displaying at least a portion of the product related information on the PCD.

2. The method of claim 1, wherein the PCD is a cellular phone.

3. The method of claim 1, wherein the PCD includes an OCR reader for reading product information, and wherein the step of entering product information includes reading the product information using the OCR reader.

4. The method of claim 1, wherein the PCD includes a scanning mechanism for scanning a product code on the specific product, and wherein the step of entering product information includes scanning the product code with the scanning mechanism.

5. The method of claim 4, wherein the product code is a bar code.

6. The method of claim 1, wherein the PCD includes a keypad, and wherein the step of entering product information includes manually entering the product information using the keypad.

7. The method of claim 1, wherein steps b) and d) are performed at substantially the same time.

8. The method of claim 1, wherein the product information library includes a relational database communicably coupled to the communication server over a network.

9. The method of claim 1, wherein the search engine is resident on one of the communication server and a second server communicably coupled to the communication server over the Internet.

10. The method of claim 1, wherein the displayed product related information includes one of competetive pricing information for multiple merchants, a product review of the specific product and locations of merchants that sell the specific product.

11. The method of claim 1, further comprising the step of the user formulating a second query in response to the displayed product related information.

12. The method of claim 11, wherein the second query includes a request to purchase the specific product from a specific merchant.

13. A method of obtaining competitive pricing information for a specific product from multiple databases associated with different merchants, said databases being accessible over the Internet via a communications server using a hand-held personal communication device (PCD), said PCD having a display, a scanning mechanism for scanning product codes, and means for communicating with the communication server, the method comprising the steps of:

a) scanning a product code into said PCD, wherein the product code is located on said specific product;
b) transmitting the product code to the communication server from the PCD;
c) retrieving a product identifier for the specific product from a product information library storing product identifiers in relation to product codes;
d) transmitting a search query to the communication server from the PCD, wherein the search query includes a request to obtain competitive pricing information for the specific product;
e) processing the search query to obtain the competitive pricing information from two or more of the multiple databases by automatically sending the product identifier to a search engine, wherein at least one of the databases is remote from the communication server;
f) retrieving the competitive pricing information by the search engine from the two or more databases using the product identifier;
g) responding to the search query by sending the competitive pricing information from the communication server to the PCD; and
h) displaying at least a portion of the competitive pricing information on the PCD.

14. The method of claim 13, further comprising the step of the user formulating a second query in response to the displayed competitive pricing information wherein the second query includes a request to purchase the specific product from a specific merchant.

15. The method of claim 13, wherein the product information library includes a relational database communicably coupled to the communication server over a network.

16. The method of claim 13, wherein the PCD is a cellular phone.

17. A communication system for obtaining information related to a specific product from multiple databases accessible over the Internet, the system comprising:

a remote communication server communicably coupled over the Internet with the multiple databases; and
a hand-held personal communication device (PCD), including:
an input mechanism for entering product information;
a keypad for manually entering alphanumeric information;
a display for displaying a user interface;
communication means for communicating with the remote communication server;
wherein when a user desires to obtain information related to a specific product, the user enters product information including at least a product code associated with the specific product using the input mechanism of the PCD and enters a search query requesting information related to the specific product, wherein the PCD retrieves a product identifier for the specific product from a product information library storing product identifiers in relation to product codes, communicates the product identifier and the query to the remote communication server via the communication means, wherein the remote server processes the query, searches two or more of the multiple databases to obtain the requested information and returns the requested information to the PCD.

18. The system of claim 17, wherein the input mechanism includes one of an OCR reader and a bar code scanner.

19. The system of claim 17, wherein the product information library includes a relational database communicably coupled to the communication server over a network.

20. The system of claim 17, wherein the requested information includes one of competitive pricing information for the specific product from multiple merchants, product review information for the specific product and locations of merchants that sell the specific product.

21. The system of claim 17, wherein the PCD is a cellular phone, a nd wherein the communication means includes a cellular transceiver.

22. A method of obtaining information related to a specific product from multiple databases accessible over the Internet via a communications server using a cellular phone having a display and means for communicating with the communication server, the method comprising the steps of:
 a) entering product information including at least a product code into the cellular phone using one of a bar code scanner and an OCR reader integrated in the cellular phone;
 b) transmitting the product code to the communication server from the cellular phone;
 c) retrieving a product identifier for the specific product from a product information library storing product identifiers in relation to product codes;
 d) transmitting a search query to the communication server from the cellular phone, wherein the search query includes a request to obtain information related to the specific product;
 e) processing the search query to obtain the product related information from two or more of the multiple databases by automatically sending the product identifier to a search engine, wherein at least one of the databases is remote from the communication server;
 f) retrieving the product related information by the search engine from the two or more databases using the product identifier;
 g) responding to the search query by sending the retrieved product related information from the communication server to the cellular phone; and
 h) displaying at least a portion of the product related information on the cellular phone display.

23. A method of obtaining personal information related to a specific product from a database accessible over the Internet via a communications server using a hand-held personal communication device (PCD), said PCD having a display and means for communicating with the communication server, the method comprising the steps of:
 a) entering product information for a product into said PCD by a user;
 b) transmitting the product information to the communication server from the PCD;
 c) transmitting a search query to the communication server from the PCD, wherein the search query includes a request to obtain personal information related to the specific product;
 d) processing the search query to obtain the product related personal information from the database;
 e) responding to the search query by sending the product related personal information from the communication server to the PCD; and
 f) displaying at least a portion of the product related personal information on the PCD.

24. The method of claim 23, wherein the personal information includes a number of times the product was purchased by the user.

25. The method of claim 1, wherein one of the multiple databases from which product related information is obtained includes product related personal information stored in relation to a user identifier.

\* \* \* \* \*

UNITED STATES PATENT AND TRADEMARK OFFICE
CERTIFICATE OF CORRECTION

PATENT NO. : 6,974,078 B1
DATED : December 13, 2005
INVENTOR(S) : David Simon

It is certified that error appears in the above-identified patent and that said Letters Patent is hereby corrected as shown below:

Column 7,
Line 12, delete "a nd wherein" and insert -- and wherein --.

Signed and Sealed this

Twenty-third Day of May, 2006

JON W. DUDAS
*Director of the United States Patent and Trademark Office*